(12) United States Patent
Campbell et al.

(10) Patent No.: US 9,898,454 B2
(45) Date of Patent: Feb. 20, 2018

(54) USING TEXT MESSAGES TO INTERACT WITH SPREADSHEETS

(75) Inventors: John Campbell, Renton, WA (US); Amy Lin, Redmond, WA (US); Lawrence Waldman, Seattle, WA (US); Daniel Mullowney, Redmond, WA (US); Jair Cazarin Villanueva, Seattle, WA (US); Daniel Parish, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 400 days.

(21) Appl. No.: 12/967,991

(22) Filed: Dec. 14, 2010

(65) Prior Publication Data

US 2012/0151315 A1   Jun. 14, 2012

(51) Int. Cl.
G06F 17/00    (2006.01)
G06F 17/24    (2006.01)
G06Q 10/10    (2012.01)

(52) U.S. Cl.
CPC ......... *G06F 17/246* (2013.01); *G06Q 10/107* (2013.01)

(58) Field of Classification Search
CPC ..................... G06F 17/246; G06Q 17/107
(Continued)

(56) References Cited

U.S. PATENT DOCUMENTS

| | | | |
|---|---|---|---|
| 6,138,130 A | 10/2000 | Adler et al. | 715/210 |
| 6,157,934 A * | 12/2000 | Khan | G06Q 10/10 709/203 |

(Continued)

FOREIGN PATENT DOCUMENTS

| | | |
|---|---|---|
| CN | 1609866 A | 4/2005 |
| CN | 1755679 A | 4/2006 |

(Continued)

OTHER PUBLICATIONS

PageOne, "SMS plug-in for Microsoft® Excel®: User Guide", Version 3.0; 30pgs, http://www.pageone.co.uk/downloads/guides/SMS_Plug-in_Excel_User_Guide_v3.0.pdf; published Mar. 9, 2010 shown using Wayback Archive documentation, pp. 1-3; http://web.archive.org/web/20100309003140/http://www.pageone.co.uk/support/downloads/manuals-and-guides; 33p total.*

(Continued)

*Primary Examiner* — William Bashore
*Assistant Examiner* — David Faber

(57) ABSTRACT

Text messages are used to interact with objects in a spreadsheet. For example, text messages may be used to enter/receive data in the spreadsheet. One or more text messages may be associated with a spreadsheet. Text messages may be associated with cells, tables, charts and other objects of the spreadsheet. When the spreadsheet receives a text message, the text message is parsed and information that is contained within the text message is used to interact with one or more objects within the spreadsheet. The spreadsheet may also generate and send text messages that provide information about the spreadsheet and/or request information to be entered within the spreadsheet. For example, the spreadsheet may send out an update of one or more values/objects within a spreadsheet and/or send a request within a text message requesting information to update a table.

20 Claims, 5 Drawing Sheets

(58) Field of Classification Search
USPC .................................. 715/212, 219, 220, 255
See application file for complete search history.

(56) References Cited

U.S. PATENT DOCUMENTS

| | | | |
|---|---|---|---|
| 6,292,810 B1* | 9/2001 | Richards | G06F 17/246 |
| | | | 707/999.1 |
| 6,323,853 B1 | 11/2001 | Hedloy | |
| 6,829,615 B2 | 12/2004 | Schimmer et al. | |
| 7,084,758 B1 | 8/2006 | Cole | 340/539.11 |
| 7,099,890 B2 | 8/2006 | Cahill et al. | |
| 7,155,665 B1 | 12/2006 | Browne et al. | 715/243 |
| 7,336,942 B2 | 2/2008 | Wang | |
| 7,433,967 B2 | 10/2008 | Anson et al. | 709/240 |
| 7,756,824 B2* | 7/2010 | Campbell | G06F 17/246 |
| | | | 707/610 |
| 7,774,002 B1 | 8/2010 | Ortega | |
| 7,783,645 B2 | 8/2010 | Hess et al. | 707/751 |
| 7,930,626 B2 | 4/2011 | Serra | |
| 8,032,125 B2 | 10/2011 | Wisebourt et al. | |
| 8,219,028 B1 | 7/2012 | Flamholz | |
| 8,332,878 B2 | 12/2012 | Harm | |
| 8,964,947 B1 | 2/2015 | Noolu | |
| 9,129,234 B2 | 9/2015 | Campbell et al. | |
| 9,330,080 B2 | 5/2016 | Muenkel | |
| 2002/0091730 A1 | 7/2002 | Bedford et al. | |
| 2002/0143780 A1 | 10/2002 | Gorman | |
| 2003/0144793 A1* | 7/2003 | Melaku | G01C 21/206 |
| | | | 701/434 |
| 2003/0200308 A1 | 10/2003 | Tameda | |
| 2003/0226105 A1 | 12/2003 | Waldau | 715/212 |
| 2004/0038664 A1 | 2/2004 | Stoks | 455/404.1 |
| 2005/0021652 A1 | 1/2005 | McCormack | |
| 2005/0097447 A1 | 5/2005 | Serra et al. | |
| 2005/0246339 A1 | 11/2005 | Kamegaya et al. | |
| 2005/0273695 A1 | 12/2005 | Schnurr | |
| 2006/0004727 A1* | 1/2006 | Anttila | G06Q 10/107 |
| 2006/0099966 A1 | 5/2006 | Moton et al. | 455/456.3 |
| 2006/0218029 A1 | 9/2006 | Chin | 705/8 |
| 2007/0029956 A1 | 2/2007 | Hofer | |
| 2007/0050699 A1 | 3/2007 | Simkhay et al. | |
| 2007/0075965 A1 | 4/2007 | Huppi et al. | |
| 2007/0136666 A1 | 6/2007 | Khen et al. | |
| 2007/0219956 A1* | 9/2007 | Milton | G06F 17/246 |
| 2008/0016436 A1 | 1/2008 | Liu | |
| 2008/0016440 A1 | 1/2008 | Liu | |
| 2008/0071467 A1 | 3/2008 | Johnson et al. | |
| 2008/0113677 A1 | 5/2008 | Madnawat | |
| 2008/0125981 A1 | 5/2008 | Steinke | |
| 2008/0132251 A1 | 6/2008 | Altman | |
| 2008/0134030 A1 | 6/2008 | Kansal et al. | |
| 2008/0162198 A1 | 7/2008 | Jabbour | |
| 2008/0171559 A1 | 7/2008 | Frank et al. | 455/456.5 |
| 2008/0182599 A1* | 7/2008 | Rainisto | H04M 1/72552 |
| | | | 455/466 |
| 2008/0235349 A1 | 9/2008 | Caspi | |
| 2009/0044095 A1 | 2/2009 | Berger | |
| 2009/0112937 A1* | 4/2009 | Campbell | G06F 17/246 |
| 2009/0112990 A1 | 4/2009 | Campbell | |
| 2009/0143056 A1 | 6/2009 | Tang | |
| 2009/0172553 A1* | 7/2009 | Sikka | G06Q 10/10 |
| | | | 715/733 |
| 2009/0177744 A1 | 7/2009 | Marlow | |
| 2009/0307190 A1 | 12/2009 | Maresca | |
| 2009/0313250 A1 | 12/2009 | Folting | |
| 2009/0319616 A1 | 12/2009 | Lewis | |
| 2010/0069096 A1* | 3/2010 | Poola | H04L 67/22 |
| | | | 455/466 |
| 2010/0115035 A1 | 5/2010 | Malhar et al. | 709/206 |
| 2010/0128855 A1 | 5/2010 | Demo | |
| 2010/0205269 A1* | 8/2010 | Poozhiyil | G06Q 10/107 |
| | | | 709/206 |
| 2010/0306179 A1 | 12/2010 | Lim | |
| 2011/0145739 A1 | 6/2011 | Berger | |
| 2011/0243125 A1 | 10/2011 | Kaal | |
| 2011/0252320 A1 | 10/2011 | Arrasvuori | |
| 2011/0264648 A1 | 10/2011 | Gulik et al. | |
| 2012/0023390 A1 | 1/2012 | Howes | |
| 2012/0072494 A1 | 3/2012 | Wong | |
| 2012/0072855 A1 | 3/2012 | Baldwin | |
| 2012/0131645 A1 | 5/2012 | Harm | |
| 2012/0144300 A1 | 6/2012 | Harm | |
| 2012/0151314 A1 | 6/2012 | Campbell | |
| 2012/0192050 A1 | 7/2012 | Campbell | |
| 2013/0007118 A1* | 1/2013 | Rochelle | G06F 17/246 |
| | | | 709/203 |
| 2015/0347373 A1 | 12/2015 | Campbell et al. | |
| 2017/0300466 A1 | 10/2017 | Campbell | |
| 2017/0300467 A1 | 10/2017 | Campbell | |

FOREIGN PATENT DOCUMENTS

| | | |
|---|---|---|
| CN | 1794231 A | 6/2006 |
| CN | 101454774 A | 6/2009 |
| CN | 101454775 A | 6/2009 |
| CN | 102725750 | 10/2012 |
| CN | 102725750 A | 10/2012 |
| GB | 2384330 A | 7/2003 |
| JP | 06301446 A | 10/1994 |
| JP | 2001-109810 A | 4/2001 |
| JP | 2003032718 A | 1/2003 |
| JP | 2004-208278 A | 7/2004 |
| JP | 2005122575 A | 5/2005 |
| JP | 2005316714 A | 11/2005 |
| JP | 2008-082883 A | 4/2008 |
| RU | 2358312 C2 | 6/2009 |
| RU | 2387003 C2 | 4/2010 |
| WO | 9929128 A1 | 6/1999 |
| WO | 180534 A1 | 10/2001 |
| WO | WO2010115204 | 10/2010 |
| WO | 2011084416 A2 | 7/2011 |

OTHER PUBLICATIONS

Greentext, "SMSbroadcast", 1 page; published as early as Sep. 28, 2010 shown using Wayback Archive, 1 page; http://web.archive.org/web/20100928002328/http://www.gntext.com/Applications/SMSBroadcast.aspx, 2 pages total.*
Microsoft Press, "Microsoft Computer Dictionary: S", published Mar. 15, 2002, Microsoft Press, pp. 1-66 + 1 cover page (67pages total).*
Le Bodic, Gwenael, "Mobile Messaging Technologies and Services SMS, EMS and MMS", 2005, John Wiley & Son, Second Ed., 455pp.*
Novak et al "MMS—Building on the success of SMS", Ericsson, 2001, pp. 102-109 https://www.ericsson.com/ericsson/corpinfo/publications/review/2001_03/files/2001031.pdf.*
Wakefield et al "Introduction to Mobile Communications: Technology, Services, Markets", Auerbach Publications, 2007, 437 pages.*
Mobile Streams, "Next Messaging: An Introduction to SMS, EMS and MMS", 2000, 25 pages.*
ACM, "From e-commerce to m-commerce: the power of the mobile internet: References", ACM, 3 pages http://dl.acm.org/citation.cfm?id=644418.*
Choi, et al.; Multi-Paradigm Spreadsheet for End Users—Published Date: Apr. 2006; http://paper.ijcsns.org/07_book/200604/200604A06.pdf; 6 pgs.
GroupSMSIndia.com; Excel Plug-In—Retrieved Date: Oct. 13, 2010; http://www.groupsmsindia.com/excel-plugin.html; 1 pg.
J. Walk & Associates, Inc.; Sending Personalized Email From Excel—Retrieved Date: Oct. 18, 2010; http://spreadsheetpage.com/index.php/tip/sending_personalized_email_from_excel/; 3 pgs.
Noyes, K.; Google Latitude Lets Users Follow Their Own Footprints—Published Date: Nov. 11, 2009; TechNewsWorld; http://mashable.com/2009/11/10/google-latitude-features/; 3 pgs.
Obrenovic, et al.; End-User Service Computing: Spreadsheets as a Service Composition Tool—Published Date: Dec. 17, 2008; http://citeseerx.ist.pst.edu/viewdoc/download?doi=10.1.1.154.7998&rep=rep1&type=pdf; 14 pgs.

(56) References Cited

OTHER PUBLICATIONS

PageOne.Co.Uk; 2 Way SMS from Your PC—Retrieved Date: Oct. 13, 2010; http://www.pageone.co.uk/service/connect/excel-plug-in; 1 pg.
PCWorld.com; Location-Based Mobile Service Helps You Remember—Published Date: May 5, 2009; http://www.pcworld.com/article/164309/locationbased_mobile_service_helps_you_remember.html; 4 pgs.
SMSCountry SMS—Excel Plugin—Retrieved Date: Oct. 13, 2010; http://www.smscountry.com/excel_download_info.asp; 2 pgs.
StrikeIronBlog; Using Microsoft Excel to Send an SMS Text Message to a List of Recipients—Published Date: Jul. 11, 2009; http://strikeiron.typepad.com/strikeiron_blog/2009/07/using-microsoft-excel-to-send-an-sms-text-message-to-a-list-of-recipients.html; 2 pgs.
Office Action mailed Jan. 6, 2014, in CN Appl. No. 201210019825.9, w/translation, 7 pg.
Office Action mailed Jan. 9, 2014, in CN Appl. No. 201110436694.X, w/translation, 15 pg.
Office Action mailed Dec. 20, 2013, issued in U.S. Appl. No. 12/967,972, 21 pg.
Lieberman, et al.; "Spatio-Textual Spreadsheets: Geotagging via Spatial Coherence"; Nov. 4-6, 2009, ACM, pp. 524-527.
Microsoft "How to convert degrees/minutes/seconds angles to or from decimal angles in Excel 2000"; Microsoft, Nov. 23, 2006; 3 pgs.
Office Action mailed Jun. 5, 2013, issued in U.S. Pat. Appl. No. 12/967,972, 18 pages.
Office Action mailed Oct. 29, 2013, issued in U.S. Appl. No. 13/012,335, 15 pages.
Chinese Third Office Action dated Dec. 31, 2014 Appl. No. 201110436694.X, 13 pgs, w/ English language translation of the first 2 pages.
Chinese First Office Action dated Jan. 9, 2014 cited in Appl. No. 201110436694.X, w/English language translation, 18 pgs.
U.S. Office Action dated Nov. 3, 2014 cited in U.S. Appl. No. 13/012,335, 28 pgs.
Chinese Second Office Action dated Sep. 12, 2014 cited in Application No. 201110436744.4, 6 pgs, w/English language transition of the first 2 pages.
Extended European Supplementary Search Report dated Sep. 23, 2014 cited in Application No. 12739904.6, pgs.
Chinese Second Office Action dated Jul. 14, 2014 cited in Appl. No. 201110436694.X, w/ English language translation, 16 pages.
Chinese Second Office Action dated Jun. 17, 2014 cited in Appl. No. 201210019825.9, 12 pgs, w/ English language transition of 4 of 7 pages of Chinese action.
Chinese Third Office Action dated Dec. 10, 2014 cited in Appl. No. 201210019825.9, 8 pgs, w/ English language transition of the first 2 pages.
PageOne, "SMS plug-in for Microsoft® Excel®: User Guide", Version 3.0; 30pgs; http://www.pageone.co.uk/downloads/guides/SMS_Plug-in_Excel_Guide_v3.0.pdf; published Mar. 9, 2010 shown using Wayback Archive documentation, pp. 1-3; http://web.archive.org/web/201 00309003140/http://www.pageone.co.uk/support/down loads/manuals-and-guides, 33 pgs total.
Chinese First Office Action dated Jan. 30, 2014 cited in Appl. No. 201110436744.4, w/ English language translation, 13 pgs.
U.S. Final Office Action dated Jun. 11, 2014 cited in U.S. Appl. No. 13/012,335, 15 pgs.
Office Action dated Feb. 2, 2015 cited in U.S. Appl. No. 12/967,972, 37 pgs.
OpenOffice.org, "Sorting and Filtering Data," Dec. 8, 2006, pp. 331-339 + 1 page, http://openoffice.blogs.com/bookresources/chapters/book_calcsortingfiltering.pdf http://openoffice.blogs.com/bookresources/2006/12/free_openoffice.html.
Chinese Notice on Grant dated Jan. 20, 2015 cited in Appl. No. 201110436744.4, w/English language translation, 4 pgs.
Chinese Fourth Office Action dated Apr. 27, 2015 cited in Appl. No. 201110436694.X, w/ English language translation, 13 pgs.
Notice of Allowance dated Apr. 24, 2015 cited in U.S. Appl. No. 13/012,335, 35 pgs.
Office Action dated Jun. 2, 2015 cited in U.S. Appl. No. 12/967,972, 23 pgs.
Chinese Decision on Rejection dated Oct. 10, 2015 cited in Appl. No. 201110436694.X, w/ English language translation, 14 pgs.
Cheung, S.L., "Using mobile phone messaging as a response medium in classroom experiments", The Journal of Economic Education 39.1 (2008): pp. 51-67, [retrieved from internet on Mar. 29, 2016] <URL: https://cyfar.org/sites/default/files/Cheung%202008.pdf>.
Chinese Notice on Grant dated Jun. 25, 2015 cited in Appl. No. 201210019825.9, w/English language translation, 4 pgs.
Japanese Office Action Issued in Patent Application No. 2013-544537, Mailed Date: Jan. 5, 2016, 4 Pages.
Japanese Office Action Issued in Patent Application No. 2013-544541 Mailed Date: Jan. 6, 2016, 6 Pages.
Australian Office Action Issued in Patent Application No. 2011341505 Mailed Date: Mar. 29, 2016, 5 Pages.
European Office Action Issued in Patent Application No. 12739904.6 Mailed Date: Mar. 22, 2016, 7 Pages.
Australian Office Action Issued in Patent Application No. 2011341497, Mailed Date: Mar. 30, 2016, 5 pages.
Australian Office Action Issued in Patent Application No. 2011341505, Mailed Date: May 9, 2016, 4 pages.
Chinese Fifth Office Action dated Apr. 5, 2016 cited in Appl. No. 201110436694.X, with English translation, 7 pgs.
Australian Notice of Acceptance Issued in Patent Application No. 2011341505 Dated: Jul. 19, 2016, 2 Pages.
SMS & CO, "SMSLibX—SMS tutorials—Sending SMS from Excel", [retrieved from internet on Mar. 29, 2016] <URL: https://web.archive.org/web/20101112005436/http://www.smsco.it/tomcat/ensms_tutorials/sms_from_excel.jsp> published on Nov. 12, 2010 as per Wayback Machine, 3 pages.
Australian Office Action Issued in Patent Application No. 2011341505, Mailed Date: Jun. 14, 2016, 4 pages.
Russian Notice of Allowance Issued in Patent Application No. 2013127120, Mailed Date: May 24, 2016, with English translation, 18 pages.
Hong Kong Certificate of Grant issued in Patent Application No. 13101087.7, mailed May 27, 2016, 3 pages.
Baycon Group, "Lesson 4: Sorting, Filtering, and Creating Relationships", online as of Jan. 2, 2010, 11 pages.
Chinese Office Action and Search Report Issued in Patent Application No. 201110436694.X, Mailed Date: Jul. 14, 2016, 16 Pages.
U.S. Appl. No. 12/967,972 Office Action dated Jun. 29, 2016 42 pgs.
Japanese Office Action Issued in Patent Application No. 2013-544541 Mailed Date: Aug. 8, 2016, with English translation 6 Pages.
U.S. Appl. No. 12/967,972, Office Action dated Dec. 9, 2016, 20 pgs.
U.S. Appl. No. 14/825,775, Office Action dated Oct. 25, 2016, 18 pages.
Russian Notice of Allowance in Application 2013127117, dated Sep. 22, 2016, 18 pages.
Chinese Notice of Allowance in Application 201110436694.X, dated Nov. 15, 2016, 4 pages.
PCT International Search Report and Written Opinion in International Application PCT/US2011/063099, dated Jul. 31, 2012, 9 pgs.
PCT International Search Report and Written Opinion in International Application PCT/US2012/022136, dated Jul. 31, 2012, 10 pgs.
PCT International Search Report and Written Opinion in International Application PCT/US2011/063199, dated Jun. 18, 2012, 10 pgs.
Russian Office Action Issued in Patent Application No. 2013127120, dated Nov. 11, 2015, 7 pages with English Summary.
Russian Office Action Issued in Russian Patent Application No. 2013127117, dated Nov. 26, 2015, 7 pages with English Summary.
SMS & Co, "SendSMS_multi.xls", [retrieved from internet on Mar. 29, 2016] <URL: https://web.archive.org/web/20101112005436/

(56) References Cited

OTHER PUBLICATIONS http://www.smsco.it/tomcat/download/sms_tutorials/SMSLibX_with_Excel.zip> published on Nov. 12, 2010 as per Wayback Machine, 10 pages.
U.S. Appl. No. 12/967,972, Advisory Action dated Feb. 27, 2017, 3 pgs.
U.S. Appl. No. 14/825,775, Notice of Allowance dated Apr. 12, 2017, 5 pgs.
U.S. Appl. No. 12/967,972, Notice of Allowance dated Jun. 30, 2017, 17 pgs.
Canadian Office Action Issued in Patent Application No. 2,819,359, dated Sep. 29, 2017, 4 Pages.
Korean Office Action Issued in Patent Application No. 10-2013-7014952, dated Sep. 15, 2017, 11 Pages.
Korean Office Action Issued in Patent Application No. 10-2013-7015245, dated Sep. 12, 2017, 7 Pages.
Canadian Office Action in Application 2819148, dated Sep. 27, 2017, 4 pages.
De Donatis, M. et al., MAP IT: The GIS software for field mapping with tablet pc, Computers & Geosciences, vol. 32, pp. 673-680, Sep. 12, 2005.
"Search Report Issued in European Patent Application No. 11849405.3", dated Dec. 6, 2017, 9 Pages.
Agarwal, Amit, "How to Remote Control your Windows PC with Email or SMS", Retrieved form <<https://www.labnol.org/software/control-computer-with-email-or-sms/9229/>>, Jul. 3, 2009, 6 Pages.
Jungman, Ville, "Would Sms Shell be Useless?", Retrieved from <<https://ubuntuforums.org/showthread.php?t=1104280>>, Mar. 23, 2009, 5 Pages.

\* cited by examiner

USING TEXT MESSAGES TO INTERACT WITH SPREADSHEETS

BACKGROUND

Many people utilize spreadsheets to interact with data. Interacting with a spreadsheet from a device having a small display can be a difficult and tedious process. For example, users need to find and load the workbook file, navigate to the place where data entry is to be added to the spreadsheet and then enter the data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Text messages are used to interact with spreadsheet objects in a spreadsheet/spreadsheet workbook. For example, text messages may be used to enter/receive data in the spreadsheet. One or more text messages may also be associated with a spreadsheet. Text messages may be associated with cells, tables, charts and other objects of the spreadsheet. When the spreadsheet system receives a text message, the text message is parsed and information that is associated with the text message is used to interact with one or more objects within the spreadsheet. The spreadsheet system may also generate and send text messages that provide information about the spreadsheet and/or request information to be entered within the spreadsheet. For example, the spreadsheet system may send out an update of one or more values/objects within a spreadsheet and/or send a request within a text message requesting information to update a table.

DETAILED DESCRIPTION

Figure 1:
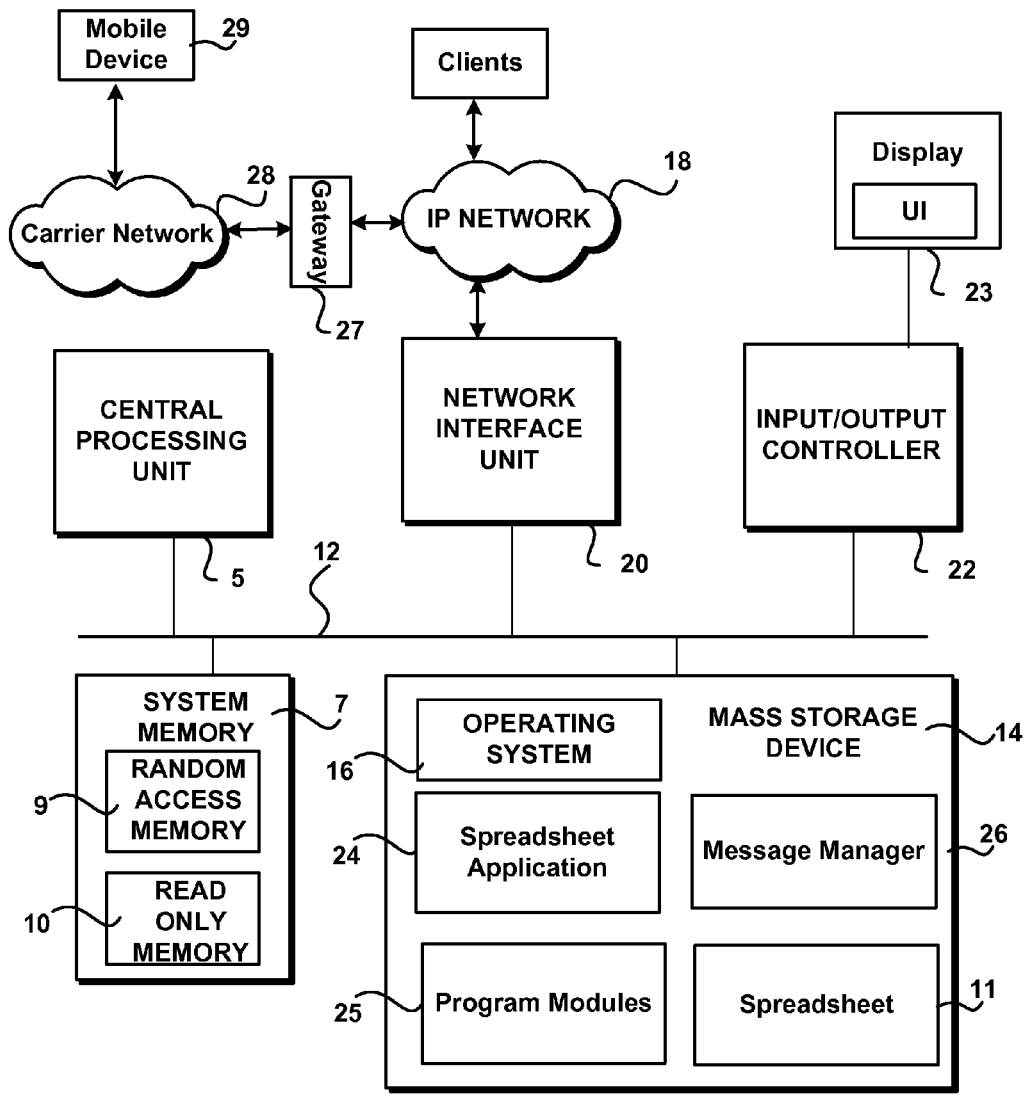
FIG. 1 illustrates an exemplary computing environment.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer environment for a computer 100 utilized in the various embodiments will be described. The computer environment shown in FIG. 1 includes computing devices that each may be configured as a server, a desktop or mobile computer, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, spreadsheet application 24, other program modules 25, and message manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide input/output to an IP phone, a display screen 23, a printer, or other type of output device.

Carrier network 28 is a network responsible for communicating with mobile devices, such as mobile device 29. The carrier network 28 may include both wireless and wired components. For example, carrier network 28 may include a cellular tower that is linked to a wired telephone network. Typically, the cellular tower carries communication to and from mobile devices, such as cell phones, notebooks, pocket PCs, long-distance communication links, and the like. Some of these communications may be messages. For example, a message may be a short message service ("SMS") message, an Enhanced Messaging Service (EMS) message, a multimedia messaging service ("MMS"), an Instant Message (IM) and the like. As used herein, the term "text message" refers to SMS messages, MMS messages and EMS messages and other types of short messages. Gateway 27 routes messages between carrier network 28 and IP Network 18.

As mentioned briefly above, a number of program modules and data files may be stored in the mass storage device 14 and RAM 9 of the computer 100, including an operating system 16 suitable for controlling the operation of a computer, such as WINDOWS SERVER® or the WINDOWS 7® operating system from MICROSOFT CORPORATION of Redmond, Wash. The mass storage device 14 and RAM 9 may also store one or more program modules. In particular, the mass storage device 14 and the RAM 9 may store one or more application programs, including a spreadsheet application 24 and program modules 25. According to an embodiment, the spreadsheet application 24 is the MICROSOFT EXCEL spreadsheet application. Other spreadsheet applications may also be used.

Message manager 26 is configured to process text messages that are associated with a spreadsheet, such as spreadsheet 11 that is associated with spreadsheet application 24. For example, mobile device 29 may send a text message to spreadsheet application 24 that is used to enter/retrieve data and/or performs operations in spreadsheet 11. Upon receiving the text message, message manager 26 parses the text message to determine the operation to perform relating to the spreadsheet. The operation may relate to many different types of operations that may be performed using the spreadsheet, such as adding, deleting, updating, retrieving, providing a parameter for a function, creating a function, starting a function, and the like. The text message may be associated with an entire spreadsheet file or to one or more objects within a spreadsheet. Text messages may be associated with cells, tables, charts and other objects of the spreadsheet. Once the text message is parsed, message manager 26 performs the determined operation.

The spreadsheet application 24, using message manager 26, may also generate and send text messages that provide information about the spreadsheet and/or request information to be entered within spreadsheet 11. For example, the spreadsheet, using message manager 26, may send out an update of one or more values/objects within spreadsheet 11 and/or send a request within a text message requesting information to update a table within spreadsheet 11. While message manager 26 is shown externally from spreadsheet application 24, the functionality of message manager 26 may be located in spreadsheet application 24 or at some other location.

Figure 2:
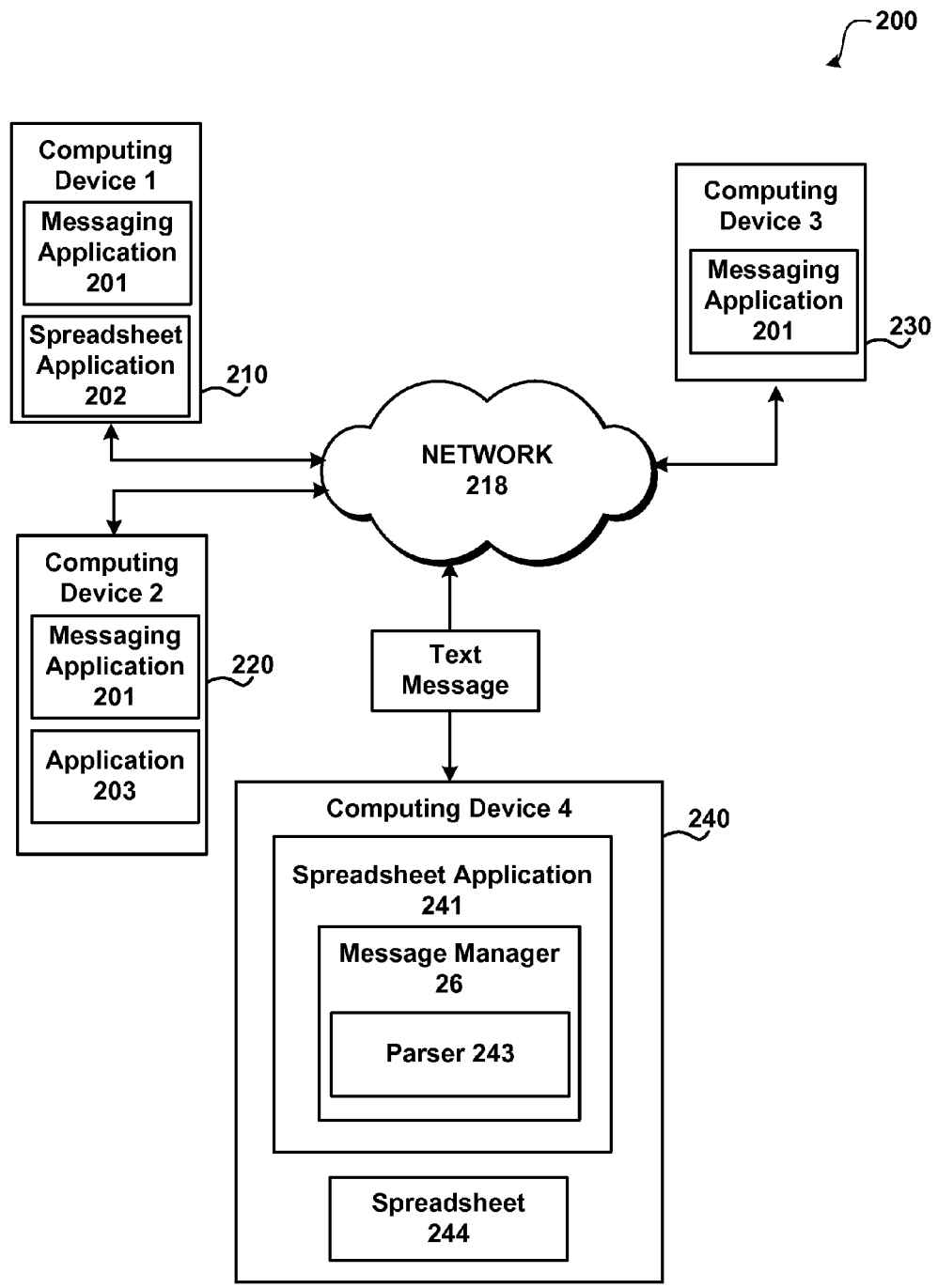
FIG. 2 shows a system for associating text messages with a spreadsheet.

FIG. 2 shows a system for associating text messages with a spreadsheet. As illustrated, system 200 includes computing device 1 (210), computing device 2 (220), computing device 3 (230) and computing device 4 (240).

The computing devices may be any type of computing device that is configured to send/receive text messages. For example, the computing devices may be mobile computing devices, such as cellular phones, tablets, smart phones, laptops, and the like and desktop computing devices such as personal computers and servers.

Computing devices 1-3 are coupled to computing device 4 through network 218. Network 218 may be many different types of networks. For example, network 218 may be an IP network, a carrier network for cellular communications and the like. Generally, network 218 can be used to transmit text messages between computing devices, such as computing device 1, computing device 2, computing device 3 and computing device 4. Each of the computing devices includes a messaging application (201) that is configured to send/receive text messages. Other applications may also be installed on some/all of the computing devices. As illustrated, computing device 1 includes a spreadsheet application 202. Computing device 2 includes application 203 that may be configured to view/enter data that is associated with a text message that is associated with a spreadsheet, such as spreadsheet 244 on computing device 4. Computing device 4 includes spreadsheet application 241 that comprises message manager 242 and parser 243. According to an embodiment, computing device 4 is configured as a server that is located within a network. For example, computing device 4 may be located within a local network or associated with an online service, such as a cloud based service. Computing device 4 may also be configured as a mobile computing device or a personal computing device.

As illustrated, computing devices 1-3 are configured to send/receive text messages to spreadsheet 244. For purposes of explanation that is not intended to be limiting assume that a user is planning a potluck event and wants to know who will be attending and what they will bring to the event. In this example, the user creates a spreadsheet file (i.e. spreadsheet 244) using spreadsheet application 241 to store the desired information. For example, the user could create a simple table within the spreadsheet 244 to store the event information. The created table contains a list of invited guests along with columns to capture whether they are attending and what they are bringing. The table may also include other information, such as a number of attendees, a number of individuals that have declined, a number that have not responded, and the like.

A text message may be associated with a spreadsheet/spreadsheet object(s) using various methods. The association may be explicit/implicit. For example, a user may select a menu option that associates a selected object to a text message. The text message may also be associated through a unique identifier and/or some other information that may be used to identify the associated spreadsheet object. For example, text messages may simply be inserted into a spreadsheet as they are received without using a unique identifier and/or some other information. Further, the content of the text message may be analyzed by a parser (e.g. natural language parser). The parser may be used to determine what actions/operations the user is trying to accomplish from the content of the message. A text message may also be formatted in a manner that indicates an association (e.g. the text message is arranged in columns where each column is mapped based on the location of the column). When associated, the spreadsheet object (in this case the table) is associated with the text message through the text address (i.e. telephone number) that is associated with the text message. Message manager 26 stores a list of the text addresses that associate one or more spreadsheet objects. The text addresses may be stored in a local data store, a global data store, the spreadsheet, an address book of a contact application, and the like.

A spreadsheet application/file may have one or more text addresses that are associated with it. A single telephone number may be used as a text address for the text message that associates the spreadsheet application. Two or more different telephone numbers may be created/used to associate spreadsheet objects within spreadsheet 244. For example, any text message that is directed to telephone number 206-XXX-YYY1 may be used to reach spreadsheet application 241. A telephone number may also be associated directly to one or more spreadsheet objects. For example, telephone number 206-XXX-YYY2 may be used to access the created table within spreadsheet 244. Telephone number 206-XXX-YYY2 may also be used to access another spreadsheet object within spreadsheet 244. Other telephone numbers (i.e. 206-XXX-YYY3, 206-XXX-YYY4 and the like), may be used to access other spreadsheet objects within spreadsheet 244.

Identifying information that is associated with a received text message may be used to determine the spreadsheet object(s) that are associated with the message. For example, one or more identifiers within the text message may be used to identify the spreadsheet file and the spreadsheet objects that are associated within the file. The identifiers may follow a defined format (e.g. spreadsheet identifier, object identifier followed by operation specific information).

Contextual information that is associated with the text message may also be used to determine the associated spreadsheet objects. For example, an identity of the user sending the text message may be determined from the received text message. The identity information may be used to access the correct spreadsheet object within the spreadsheet file. In the current example, the identity of the user the text message is received from may be used to locate the name of the invitee within the table. Other contextual information may also be able to be determined from the text message, such as location information, time information, date information, and the like.

The text message also contains information that relates to an operation to perform using the spreadsheet. The information may be data that are to be placed within the spreadsheet (i.e. a number, metadata, a hyperlink, a time, a location, identity of user, text), one or more parameters to place into a formula, a formula to place within the spreadsheet, a spreadsheet object (e.g. table, chart, image . . . ) and/or values to place within a table of the spreadsheet, a request for information from the spreadsheet (i.e. one or more values, a formula, a chart), a reference to a location of where to obtain data to place within the spreadsheet, inserting rows, deleting rows, deleting values/objects, and the like. The location may be automatically determined by the computing device or the user may place the location within the text message. The identity of the user may be automatically determined by the computing device or the user may place that information within the text message.

A user may also specify that a text message be sent to other users that requests information from the specified users. In the event planning example, a user may specify that a text message be sent to each invitee that requests a response. The text message may ask each invitee to reply with whether they are coming to the event and what they are bringing. Other parameters that are associated with the text message may also be provided. For example, a time to send the text message, preferred numbers indicating where to send the text message, a contact list(s) that may be used to automatically locate the telephone numbers to text to, whether to send an MMS or SMS message, and the like. A spreadsheet object may also be associated with other types of messages, such as IM messages. For example, instead of associating text messages, IM messages may be associated with one or more spreadsheet objects. A combination of message types may also be used (e.g. some text messages, some IM messages, some email messages, and the like). A user may also specify that a text message be sent to other users that provides information from the specified users. In the event planning example, a user may specify that a text message be sent to each invitee that provides them with a list of the guests attending the event and what they are bringing.

Message manager 26 may also be configured to periodically send text messages based upon various conditions that may be specified by a user. The conditions may relate to a non-occurrence of an event (i.e. an invitee has not responded within a set period of time), an occurrence of an event (an invitee has accepted), and/or other conditions that are specified by the user. For example, the user may provide a formula that is used to determine when to send text messages. A text message may also be sent when one or more cells change (e.g. value of a cell changes to a different value). Text messages may also be sent to provide one or more users with information that is contained within the spreadsheet. In the potluck planning example, the creator of the event may configure the spreadsheet application to send an update whenever an invitee accepts/rejects the invitation. The event organizer may also periodically receive a text message from the spreadsheet showing a simple calculation, such as total number of people who have responded and total number that are attending.

In the potluck planning example, the invitees receive the text message, see the questions that are contained within the text message, and then reply to the text message with their response. The questions may specify a specific format for the reply (i.e. "YES" or "NO" followed by a space that is followed by a text string of what they are bringing. A specific format may not be required. For example, the question may be "Please respond to this text message if you will be attending the event." In this case, the user could merely reply with/without any content within the text message that specifies an answer. Message manager 26 receives the response, parses the text message using parser 243, and fills in the appropriate row of the table corresponding to the participant who replied. This makes a simple data collection scenario work in an intuitive way using a familiar entry (text) on small screen display devices, such as mobile devices, that many users have with them.

While message manager 26 is shown externally from spreadsheet 244, the functionality of message manager 26 may be located in spreadsheet application 241 or at some other location.

Figure 3:
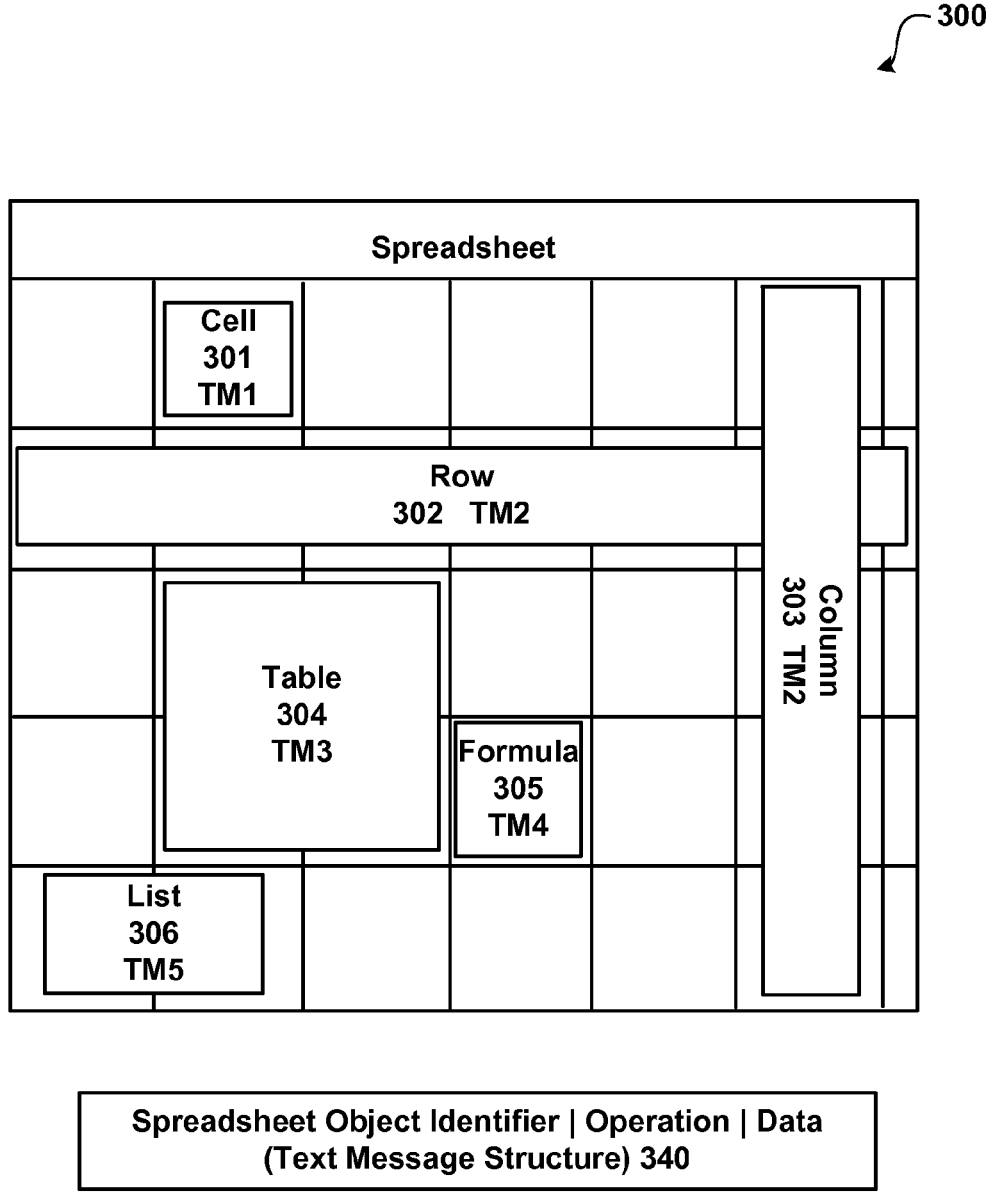
FIG. 3 shows a spreadsheet associated with text messages.

FIG. 3 shows a spreadsheet associated with text messages. As illustrated spreadsheet 300 shows different spreadsheet objects including cell 301, row 302, column 303, table 304, formula 305 and list 306. While only one object of each type is shown, more or fewer objects may be included within spreadsheet 300 that are associated with one or more text messages. Other objects may also be included within spreadsheet 300 that are associated with a text message.

As discussed above a text message may be associated with spreadsheet and to zero or more objects within the spreadsheet. In the current example text message 1 (TM1) is associated with cell 301. Text message 2 (TM2) is associated with row 302 and column 303. Text message 3 (TM3) is associated with table 304. Text message 4 (TM4) is associated with formula 305. Text message 5 (TM5) is associated with list 305. Any number of text messages may be used to associate spreadsheet objects. A single text message may be associated with spreadsheet 300 that is used to access the different objects that are located within spreadsheet 300.

When a single text message associates different objects, the text message may include identifying information to locate the spreadsheet object within the spreadsheet. According to an embodiment, each spreadsheet and spreadsheet object is identified by a unique identifier that is placed within the text message to identify the spreadsheet object.

The unique identifier may be a number, text and/or some combination of numbers and text. When sending a text message to update a spreadsheet object, the unique identifier for the object may be placed within the text message (i.e. at the beginning of the text message, at the end, or in some other location). The unique identifiers may be stored within the spreadsheet and/or in some other location (e.g. a memory/data store of a computing device).

For example, a text message may include a name of a spreadsheet object, a location of the spreadsheet object within the spreadsheet, and/or combine this information with contextual information that may be determined from the text message. For example, a name of the sender, date and time the text message, a location of the sender, a carrier of the sender, may be able to be determined from the text message. The contextual information may be used alone and/or in combination with content from the text message to determine the spreadsheet object. When a different text address is associated with each spreadsheet object, the text messages does not need to identify the spreadsheet object within the text message itself.

Many different operations may be performed to associated spreadsheet objects. For example, a value/object within cell 301 may be updated, deleted, queried using text messages.

Text message structure 340 illustrates an exemplary structure that may be used in associating a text message to a spreadsheet. The spreadsheet object identifier is an identifier that identifies the associated spreadsheet object. According to an embodiment, the spreadsheet object identifier may not be used (e.g. a separate text message address for the spreadsheet object, the spreadsheet object can be determined from contextual information that is associated with the text message). The operation may be many different values, such as: update, delete, query, new formula, execute formula, and the like. The data are used in performing the operation. For example, the data may be value(s) to be used with the operation, a formula, a link to content (e.g. picture, video, file), content, parameters for a formula, and the like. Other structures may be used. Text message structure 340 may or may not be included when a text message is sent by the spreadsheet to a user. In some examples, the spreadsheet may send a text message with summary information that only includes the information that is obtained from the spreadsheet. In other examples, the spreadsheet may include some/all of the text message structure such that a user may use the information when replying to the text message (e.g. "Please type "Table304" followed by a "Yes" or "No" response.").

Figure 4:
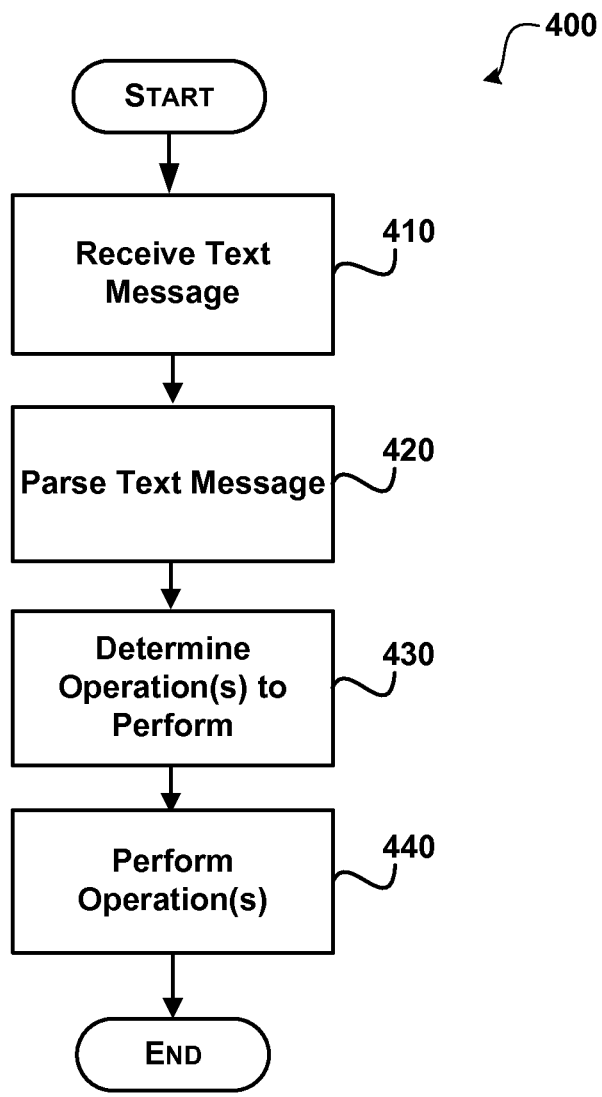
FIG. 4 illustrates a process for receiving a text message associated with a spreadsheet.
Figure 5:
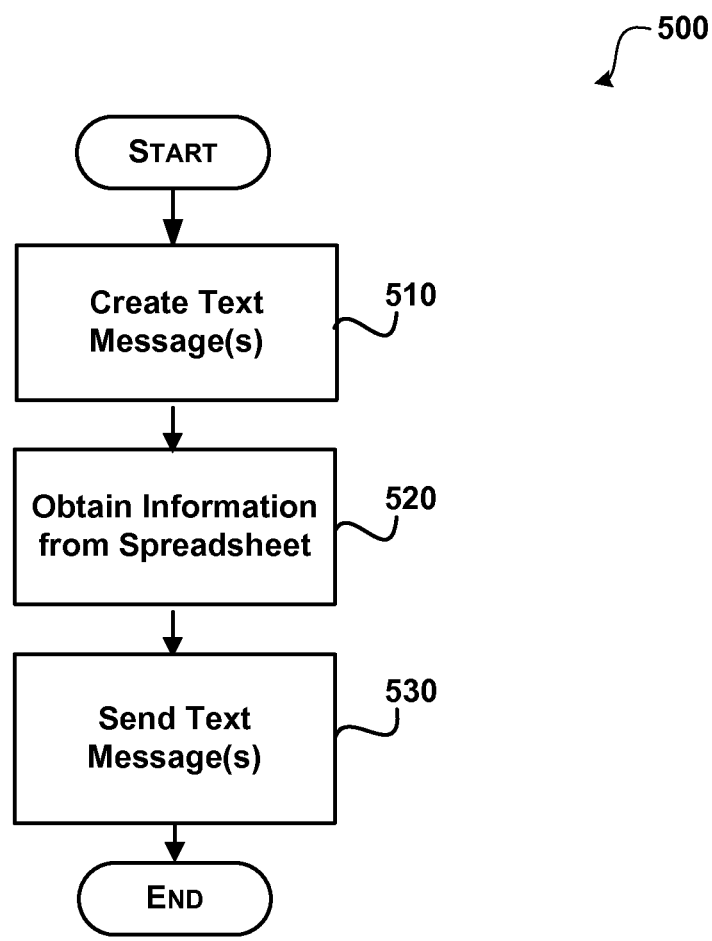
FIG. 5 shows an illustrative process for creating and sending a text message from a spreadsheet.

Referring now to FIGS. 4-5, illustrative processes for associating text messages to spreadsheets will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

Referring now to FIG. 4, a process 400 for receiving a text message associated with a spreadsheet is shown.

After a start block, the process moves to operation 410, where a text message is received that is addressed to the spreadsheet. A spreadsheet may have one or more text addresses that are associated with it. For example, a spreadsheet may have different text addresses for each associated spreadsheet object within the spreadsheet, the spreadsheet may have a single text address for the associated spreadsheet, the spreadsheet may use a first text address for multiple objects and a second text address for a single spreadsheet object, and the like. Multiple spreadsheets may also be associated with one or more text addresses. For example, a single text address may be associated with two or more spreadsheets.

Moving to block 420, the text message is parsed. Generally, parsing the text message obtains information from the text message that is used in interacting with the spreadsheet and spreadsheet objects. The parsing may include examining the content of the text message to determine the associated spreadsheet object(s) to which the message relates, the operation(s) to perform, and the data that is used in performing the operations. Parsing the text message may also be used to determine contextual information. For example, the sender of the text message may be identified and this information may then be used by another service to determine additional information (e.g. where is the sender of the text message located?, what is a title of the sender?, what organization does the sender belong to?).

Transitioning to operation 430, the operation(s) to perform using the associated spreadsheet objects are determined. All/some of the operations may be explicitly defined within the text message and/or all/some of the operations may be implicitly determined from the text message. When explicitly defined, the operation(s) to perform are directly identified within the text message. For example, a name of the operation(s) to perform may be included and/or some other identifying information may be used (e.g. a number that is used to look up the operation). When implicitly defined, contextual information that is associated with the text message may be used to determine an operation to perform. The sender information may be used to associate one or more objects within a spreadsheet (e.g. a row is assigned/created for each user). Data content of the message may also be used to determine the associated spreadsheet objects (e.g. a vote of "Yes") that is received from a user may be placed into the "Yes" column. In some examples, a text message may be received that does not indicate an associated spreadsheet object. In this case, data may be added at a predefined location within the spreadsheet or rejected. The predefined location may be at the end of a spreadsheet, a new row, a new column, and the like.

Flowing to operation 440, the operation(s) that are identified from the text message are performed on the associated spreadsheet object(s). The operation(s) may include a variety of operations such as updating a spreadsheet object and then the spreadsheet sending a text message to one or more users that provides the update. The operation(s) may also involve retrieving data from another location that is identified within the text message. For example, a text message may instruct the spreadsheet to place a file that is located external from the text message within the associated spreadsheet object. The operation(s) may also involve retrieving information from the spreadsheet and storing the retrieved information at a location that is specified within the text message.

The process then flows to an end block and returns to processing other actions.

FIG. 5 shows an illustrative process for generating and sending a text message from a spreadsheet.

After a start operation, the process flows to operation 510 where a text message is created that is associated with the spreadsheet. The text message may be directed to one or more text addresses and may be used to provide information about the spreadsheet to the addressees, request information from the addressees that is used within the associated spreadsheet or some combination of providing information and requesting information. The text message may be created automatically in response to an event or some other condition. For example, a text message may be created at a specified time, in response to a user request, in response to receiving a text message from a user, and the like.

Moving to operation 520, information is optionally obtained from the spreadsheet. The information obtained relates to the text message to be sent. The information may comprise different information depending on the purpose of the text message. When the text message provides values/objects to a user, the information that is obtained are values/objects from the spreadsheet. When the text message requests values from a user, information that identifies the associated spreadsheet object may be included in the text message.

Flowing to operation 530, the text message(s) are sent to the addressees. A copy of the text messages that are sent may be stored for later use. For example, when a text message is received by the spreadsheet, the spreadsheet may examine the list of stored text messages to determine what the text message relates to (e.g. the text message is a response to a previous request for information). The stored text messages may also be used to determine whether or not a response has been received. When a response has not been received after some period of time, the spreadsheet may automatically resend the request at the same text address and/or a different text address that is associated with the user that has not responded.

The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for associating text messages to a spreadsheet stored on a first computing device, comprising:
   receiving a text message from a second computing device directed to a text address associated with at least one spreadsheet object within the spreadsheet, wherein the spreadsheet comprises one or more spreadsheet objects, wherein the text message comprises one of: an instant message (IM), a short message service (SMS) message, an enhanced messaging service (EMS) message, and a multimedia messaging service (MMS) message, wherein the text address is a number, and wherein the text message is not associated with a spreadsheet stored on the second computing device;
   parsing the text message received from the second computing device to determine the at least one spreadsheet object of the one or more spreadsheet objects associated with the text message, wherein determining the at least one spreadsheet object is based at least in part on the text address;
   determining an operation to perform in the spreadsheet from the text message; and
   performing the operation in the spreadsheet, wherein the operation comprises accessing the associated at least one spreadsheet object.

2. The method of claim 1, further comprising, the spreadsheet automatically generating a spreadsheet text message and sending the spreadsheet text message from the spreadsheet to one or more text message addressees.

3. The method of claim 2, wherein the spreadsheet text message requests one or more users associated with the one or more text message addressees to send a reply text message to the spreadsheet that includes requested information that is specified within the spreadsheet text message.

4. The method of claim 2, wherein determining the at least one spreadsheet object within the spreadsheet that is associated with the text message comprises determining contextual information that is associated with the text message.

5. The method of claim 2, wherein the spreadsheet text message is automatically generated in response to updating one or more values or one or more objects within the spreadsheet, wherein the spreadsheet text message comprises information relating to the update of the one or more values or the one or more objects.

6. The method of claim 2, wherein the text message comprises a formula to place in the spreadsheet, wherein the formula in the text message comprises input parameters for the formula.

7. The method of claim 1, wherein parsing the text message comprises parsing the text message to further determine when the text message comprises at least one of: a hyperlink, text, a number and an image.

8. The method of claim 1, wherein the text message comprises an operation specifying at least one of: adding, deleting, updating, retrieving, providing a parameter for a function, creating a function, starting a function, and accessing data specified by a parameter in the text message.

9. The method of claim 1, wherein the text message includes a spreadsheet object identifier, an operation, and data relating to the operation, and wherein the spreadsheet object identifier is used to associate the text message to the spreadsheet object within the spreadsheet.

10. The method of claim 1, wherein receiving the text message comprises receiving the text message in response to a spreadsheet text message sent by the spreadsheet.

11. A first computing device comprising a processing unit and a memory storing computer-executable instructions that when executed by the processing unit perform a method for associating a text message to a spreadsheet, comprising:
   generating a spreadsheet text message requesting information that relates to one or more spreadsheet objects that are contained within the spreadsheet;
   sending the spreadsheet text message to at least one address using a spreadsheet application;
   receiving a text message from a second computing device as a reply to the spreadsheet text message, wherein the text message comprises one of: an instant message (IM), a short message service (SMS) message, an enhanced messaging service (EMS) message, and a multimedia messaging service (MMS) message, wherein the text message is directed to a text address associated with at least one spreadsheet object within the spreadsheet and comprises a response to the requested information, wherein the text address is a number, wherein the text message is not associated with a spreadsheet stored on the second computing device, and wherein the second computing device is associated with the at least one address;

parsing the text message to determine the at least one spreadsheet object of the one or more spreadsheet objects associated with the text message, wherein determining the at least one spreadsheet object is based at least in part on the text address;

determining an operation to perform in the spreadsheet; and performing the operation in the spreadsheet, wherein the operation comprises using the requested information that is contained within the received text message.

12. The first computing device of claim 11, further comprising, the spreadsheet system automatically generating the spreadsheet text message.

13. The first computing device of claim 12, further comprising:

automatically generating a second spreadsheet text message in response to updating one or more values or one or more objects within the spreadsheet; and automatically sending the second spreadsheet text message, wherein the second spreadsheet text message comprises information relating to the update of the one or more values or the one or more objects.

14. The first computing device of claim 11, further comprising determining when the text message comprises at least one of: a hyperlink, text, a number and an image.

15. The first computing device of claim 11, wherein the text message comprises an operation specifying at least one of: adding, deleting, updating, retrieving, providing a parameter for a function, creating a function, starting a function, and accessing data specified by a parameter in the text message.

16. The first computing device of claim 11, wherein the text message includes a spreadsheet object identifier, an operation and data relating to the operation, wherein the spreadsheet object identifier is used to associate the text message to the spreadsheet object within the spreadsheet.

17. A first computer system for associating a message to a spreadsheet, comprising:

a central processing unit (CPU), and a computer-readable storage device;

an operating environment stored on the computer-readable storage device and executing on the CPU;

a spreadsheet application;

a spreadsheet, wherein the spreadsheet comprises one or more spreadsheet objects;

a message manager operating in conjunction with the spreadsheet application that is configured to perform actions comprising:

receive a text message from a second computer system addressed to a text address associated with a spreadsheet object of the spreadsheet, wherein the text message comprises one of: an instant message (IM), a short message service (SMS) message, an enhanced messaging service (EMS) message, and a multimedia messaging service (MMS) message, wherein the text address is a number, wherein the text message is not associated with a spreadsheet stored on the second computer system;

parse the text message received from the second computer system to determine the spreadsheet object within the spreadsheet that is associated with the text message, wherein determining the spreadsheet object is based on the text address;

determine an operation to perform in the spreadsheet, wherein the operation comprises at least one of: adding, deleting, updating, retrieving, providing a parameter for a function, creating a function, starting a function, and accessing data specified by a parameter in the text message;

perform the operation in the spreadsheet, wherein the operation comprises accessing the associated spreadsheet object; and automatically generate a spreadsheet message and send the spreadsheet message to one or more text addressees.

18. The first computer system of claim 17, wherein the text message manager is further configured to store the text address associated with the spreadsheet object within an address book of a contact application.

19. The first computer system of claim 17, further comprising, the spreadsheet automatically generating a spreadsheet text message and sending the spreadsheet text message from the spreadsheet to one or more text message addressees.

20. The first computer system of claim 19, wherein the spreadsheet text message is automatically generated in response to updating one or more values or one or more objects within the spreadsheet, wherein the spreadsheet text message comprises information relating to the update of the one or more values or the one or more objects.

* * * * *